March 24, 1964 C. B. MOORE 3,126,026
TRANSDUCERS
Filed Sept. 18, 1961

INVENTOR.
COLEMAN B. MOORE
BY
ATTORNEY

United States Patent Office 3,126,026
Patented Mar. 24, 1964

3,126,026
TRANSDUCERS
Coleman B. Moore, Uwchland, Pa., assignor to Moore Products Co., Philadelphia, Pa., a corporation of Pennsylvania
Filed Sept. 18, 1961, Ser. No. 138,971
6 Claims. (Cl. 137—85)

This invention relates to transducers and more particularly to a transducer having an improved character of operation.

Difficulties arise with transducers now available and under certain operating conditions because of ambient accelerations encountered in use.

It has heretofore been proposed to attenuate the action of operating and other forces applied in transducers by the use of viscous damping with dashpots and the like. Damping devices of the viscous type, in addition to attenuating certain forces as desired, also attenuate the normal operating forces so that the transducer has a poor frequency response.

It is the principal object of the present invention to provide a transducer having an output condition responsive to displacement of a moving element in which the element is rendered insensitive to acceleration in a predetermined direction.

It is a further object of the present invention to provide an electric to pneumatic transducer in which the effects of ambient vibration are eliminated.

It is a further object of the present invention to provide an electric to pneumatic transducer in which a buoyancy effect is applied to a movable member for eliminating the effects of ambient vibration.

Other objects and advantageous features of the invention will be apparent from the description and claims.

Figure 1:
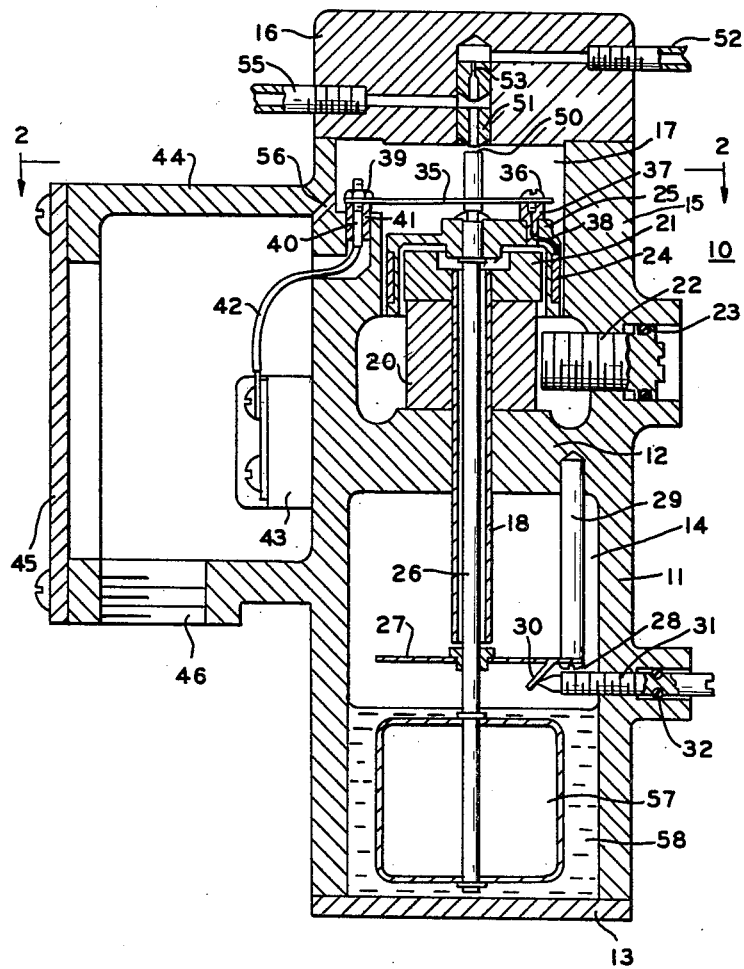
Figure 2:
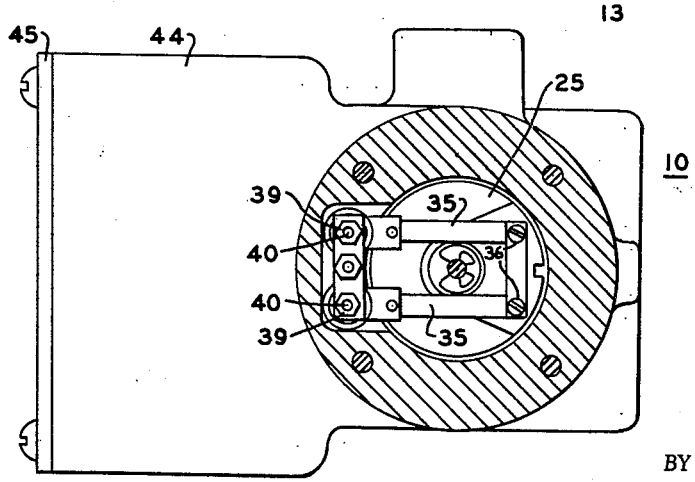

The nature and characteristic features of the invention will be more readily understood from the following description, taken in connection with the accompanying drawings forming part thereof in which:

FIGURE 1 is a view in vertical central section, and partly diagrammatic, showing an electric to pneumatic transducer to which the present invention is particularly applicable; and FIG. 2 is a horizontal sectional view taken approximately on the line 2—2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

The apparatus for carrying out the invention, in a specific embodiment, includes a device for transmitting fluid pressure in a predetermined range proportional to an electric current applied at an input coil, with a movable element positioned by the input and controlling the transmitted fluid pressure, together with provisions for eliminating the effects of ambient vibration by a buoyant action applied on the movable element.

Referring now more particularly to the drawings, a main housing 10 of generally cylindrical shape is provided having a lower hollow section 11 with a central partition 12 and a bottom wall 13 therebelow enclosing a lower interior chamber 14.

The upper hollow section 15 of the main housing 10 is closed by an upper housing closure section 16 which is secured in position on the top of the housing 10 and provides an upper boundary of an upper interior chamber 17. The chamber 17 has in the interior thereof a fixed central mounting tube 18, preferably of non-magnetic responsive material such as aluminum or stainless steel, which extends vertically in the upper chamber 17, downwardly through the partition wall 12 and into the lower chamber 14.

Mounted on the tube 18, within the upper chamber 17 and on the top face of the partition 12, a magnet 20 is provided preferably of ultra high magnetic intensity material, available under the name "Alnico," and in the form of a ring. A pole ring 21 threaded on the upper end of the tube 17 and forming part of the magnetic circuit retains the magnet 20 in place. An adjustable plug 22 of magnetic responsive material is threaded in the side wall of the upper section 15 of the housing 10 above the partition wall 12 and extending radially into the chamber 17 towards the magnet 20 and can be provided to short circuit some of the flux from the magnet 20 to alter the range of sensitivity of the device.

The plug 22 is accessible for manual adjustment from the exterior of the housing 10 and is preferably provided with a packing ring 23, such as an O-ring, for preventing fluid leakage.

The pole piece 21 is preferably spaced inwardly from the side wall of the chamber 17 and a hollow cylindrical coil 24 of wire mounted on a cup-shaped coil support plate 25 is provided for movement vertically with respect to the pole piece 21.

The coil support plate 25, of non-magnetic responsive material, is preferably fixedly mounted on a rod 26 also of non-magnetic responsive material, such as aluminum or stainless steel.

The rod 26 extends through the tube 18 and is supported in the chamber 14 by a lower leaf spring 27. The leaf spring 27 is secured at one end by a stud 28 to a post 29 in the chamber 14. The post 29 extends downwardly from the partition 12 in the chamber 14. The spring 27 has an inclined ear portion 30 projecting therefrom for engagement by an exteriorly accessible adjusting screw 31 mounted in the side wall of the lower section 11 of the housing 10. The screw 31 preferably has a groove with a packing 32 such as an O-ring, for preventing fluid leakage.

The coil support plate 25 is preferably supported by a pair of upper leaf springs 35 which are secured thereto by studs 36 extending into insulated posts 37. The posts 37 have conductors 38 carried therein which are connected to the ends of the winding of the coil 24. The leaf springs 35 provide conductors for energization of the coil 24 and are held by nuts 39 on hollow threaded posts 40 in insulating sleeves 41 in the housing 10. Insulated conductors 42 extend through the posts 40 to a connection block 43 mounted within a junction box 44. The junction box 44, provided on the side of the housing 10, has an access cover 45 and an opening 46 for input conductors (not shown) leading to the connection block 43.

The upper end face 50 of the rod 26 is preferably flat for cooperation with a sharp edged nozzle 51 mounted in the upper closure section 16. The nozzle 51 has a fluid supply connection 52 communicating therewith through a restriction 53. The fluid supply connection 52 is connected to a suitable source of pressure regulated and filtered fluid, such as air.

An output connection 55 is provided in the closure section 16 which is connected between the nozzle 51 and the restriction 53 for the transmission of the nozzle pressure to any suitable equipment, such as an indicator, recorder, controller or pneumatic relay responsive to the transmitted pressure.

The details of construction of the restriction 53 and nozzle 51 are not part of the present invention, but are described in detail in an application for patent of Robert B. Adams, Serial No. 140,089, filed Sept. 22, 1961.

In the side wall of the upper section 15 of the housing 10 a vent 56 is provided for permitting the escape of air exhausted from the nozzle 51. The vent 56 preferably communicates with the junction box 44 and provides a purging action.

It will be noted that the sleeve 18 extends a substantial distance into the chamber 14 towards the location at which the lower leaf spring 27 is connected to the rod 26, and that the rod 26 extends therebeyond toward the bottom wall 13. The rod 26 has secured to the lower end thereof a float 57, preferably of hollow type. The lower part of the chamber 14 to and above any position which can be taken by the float 57 is filled with a liquid 58 of relatively low viscosity, such as light oil.

The weight of the liquid 58 displaced by the float 57 is such that it is substantially equal to the entire effective weight of the moving system, including the float 57, the rod 26, the coil 24, the coil support plate 25, the upper leaf spring 35 and the lower leaf spring 27.

The mode of operation will now be pointed out.

Current supplied through the conductors 42 and the leaf springs 35 is effective in the coil 24 to set up a magnetic field in the coil 24. This field reacts with the magnetic field which includes the magnet 20, the main housing 10 surrounding the coil 24 and the pole piece 21 to produce an upward axial force which is applied by the coil support plate 25 to the rod 26. The effect of this force is to reduce the clearance between the face 50 of the rod 26 and the nozzle 51 and restricts the flow of fluid from the nozzle 51.

The pressure inside the nozzle 51 increases until the downward force applied at the nozzle 51 against the face 50 is substantially equal to the force induced by the coil 24.

With the increased pressure the rod 26 is forced back almost to its original position and further rise of the pressure in the nozzle 51 is terminated.

If the effective area of the nozzle 51 is constant over the entire range of nozzle-to-seat clearances required in balance over the entire range of operation then the relationship between the nozzle pressure and the coil current will be linear.

The nozzle back pressure is effective through the outlet connection 55 for direct transmission to other devices such as an indicator, recorder, controller, pneumatic relay or the like.

The vent 56 provides for escape of air exhausted from the nozzle 51 and the vent 56 by its communication with the junction box 44 provides a purge.

The leaf springs 35 and 27 are quite stiff in the transverse direction, prevent adverse transverse acceleration effects, and maintain the coil 24 substantially central in the air gap. Flexibility in the axial direction is provided by this mounting.

The float 57 in the liquid 58 provides sufficient buoyancy to neutralize the entire weight of the moving system.

The effective weightlessness of the system makes it immune to axial acceleration or vibration without the use of a high viscosity damping fluid. The fluid which provides the buoyancy may be selected to have as low a viscosity as desired to permit retention of the dynamic response to normal operating signals.

The filling liquid 58 is also retained within the chamber 14 during handling prior to installation by the arrangement which includes the downward disposition of the tube 18 in the chamber 14 and the sealing of the adjusting screw 31.

I claim:

1. In a transducer, a housing, a partition in said housing providing a chamber, a movable member having portions inside and outside said chamber, resilient mounting members for said movable member restraining movement of said member transverse to its longitudinal axis, means outside said chamber for applying to said movable member a force responsive to an input condition, a source of fluid pressure, a fluid pressure transmitter member connected to said source and having an output controlled by said movable member, a buoyant member in said chamber and connected to said movable member, and a liquid in said chamber in which said buoyant member is immersed, said buoyant member overcoming the weight of said movable member and said resilient mounting members.

2. In a transducer, a housing, a partition in said housing providing a chamber, a movable member having portions inside and outside said chamber, resilient mounting members for said movable member restraining movement of said member transverse to its longitudinal axis, means outside said chamber for applying to said movable member a force responsive to an input condition, a source of fluid pressure, a fluid pressure transmitter member connected to said source and having an output pressure controlled by said movable member, means for applying a restoring force proportional to the output pressure on said movable member, a buoyant member in said chamber and connected to said movable member, and a liquid in said chamber in which said buoyant member is immersed, said buoyant member overcoming the effect of longitudinal acceleration on said movable member.

3. In a transducer, a housing, a partition in said housing separating the interior of said housing into two chambers, a device for producing a magnetic field in one of said chambers, a movable member having portions in said chambers, resilient mounting members for said movable member restraining movement of said member transverse to its longitudinal axis, means for applying to said movable member a longitudinal force responsive to a variable electric current, said means including a coil for said current secured to said movable member, a portion of said coil being disposed in said magnetic field for producing on said coil a force proportional to said current, a source of fluid pressure, a fluid pressure transmitter connected to said source of fluid pressure and having an output pressure controlled by said movable member, means for applying a restoring force proportional to the output pressure on said movable member, a buoyant member in another of said chambers and connected to said movable member, and a liquid in said other of said chambers in which said buoyant member is immersed, said buoyant member overcoming the effect of longitudinal acceleration on said movable member.

4. In a transducer, a housing, a partition in said housing separating the interior of said housing into two chambers, a vertical tubular member extending from one of said chambers into the other of said chambers, said tubular member being open at both ends and providing communication for gaseous fluid between said chambers, a movable member in said tubular member having portions in said chambers, resilient mounting members for said movable member restraining movement of said member transverse to its longitudinal axis, means in one of said chambers for applying to said movable member a force responsive to an input condition, a source of fluid pressure, a fluid pressure transmitter member connected to said source and having an output pressure controlled by said movable member, a buoyant member in said other of said chambers and connected to said movable member, and a liquid confined in said other of said chambers in which said buoyant member is immersed, said tubular member extending into said other chamber and preventing outflow of said liquid, said buoyant member overcoming the weight effective at said movable member.

5. In a transducer, a housing, a partition in said housing separating the interior into an upper chamber and a lower chamber, a vertical tubular member extending from said upper chamber into said lower chamber, said tubular member being open at both ends and providing communication for gaseous fluid between said chambers, a movable rod in said tubular member, means in the upper of said chambers for applying on said rod coaxially thereof a force responsive to an input condition, a source of fluid pressure, a fluid pressure transmitter having a fluid input connection connected to said source, a nozzle in said upper chamber connected to said fluid input connection, and a fluid take-off connection, said rod having a face portion for positioning with respect to said nozzle for controlling the delivery therefrom and against which the nozzle pressure is effective for applying a restoring force on said rod, a buoyant member in said lower chamber connected to said rod, and a liquid confined in said lower chamber in which said buoyant member is immersed, said tubular member preventing outflow of said liquid, said buoyant member overcoming the weight effective at said movable member.

6. In a transducer, a housing, a partition in said housing separating the interior into an upper chamber and a lower chamber, a vertical tubular member extending from said upper chamber into said lower chamber, said tubular member being open at both ends and providing communication for gaseous fluid between said chambers, a device for producing a magnetic field mounted on said tubular member in said upper chamber, a movable rod in said tubular member, means for applying to said movable member a longitudinal force responsive to a variable electric current, said means including a coil for said current secured to said rod, a portion of said coil being disposed in said magnetic field for producing on said coil a force proportional to said current in a predetermined direction coaxial with said rod, a source of fluid pressure, a fluid pressure transmitter having a fluid input connection connected to said source, a nozzle in said upper chamber connected to said fluid input connection, said fluid pressure transmitter having a fluid take-off connection, said rod having a face portion for positioning with respect to said nozzle for controlling the delivery therefrom and against which the pressure is effective for applying a restoring force on said rod, a bouyant member in said lower chamber connected to said rod, and a liquid confined in said lower chamber in which said buoyant member is immersed, said tubular member preventing outflow of said liquid, and said buoyant member overcoming the weight effective at said movable member.

References Cited in the file of this patent
UNITED STATES PATENTS

| | | |
|---|---|---|
| 1,435,396 | Howland | Nov. 14, 1922 |
| 1,887,322 | Nettleton | Nov. 8, 1932 |
| 2,472,056 | Otis | May 31, 1949 |
| 2,844,157 | Griffith | July 22, 1958 |
| 3,021,859 | Liantonio | Feb. 20, 1962 |